(12) United States Patent
Stevens et al.

(10) Patent No.: US 7,350,819 B2
(45) Date of Patent: Apr. 1, 2008

(54) PRETENSIONER

(75) Inventors: Bruce A. Stevens, Oakland, MI (US); Steven M-G Dunham, Mt. Clemens, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/281,322

(22) Filed: Nov. 16, 2005

(65) Prior Publication Data

US 2006/0131866 A1  Jun. 22, 2006

Related U.S. Application Data

(60) Provisional application No. 60/628,574, filed on Nov. 17, 2004.

(51) Int. Cl.
*B60R 22/36* (2006.01)

(52) U.S. Cl. ............................ 280/806; 297/480

(58) Field of Classification Search ........... 280/741, 280/736, 806; 297/480; 60/632; 102/530, 102/531

See application file for complete search history.

(56) References Cited

U.S. PATENT DOCUMENTS

| 4,558,832 | A | 12/1985 | Nilsson | 242/374 |
|---|---|---|---|---|
| 4,597,546 | A | 7/1986 | Yamamoto et al. | 242/382.2 |
| 5,222,994 | A | 6/1993 | Hamaue | 242/374 |
| 5,439,537 | A * | 8/1995 | Hinshaw et al. | 149/22 |
| 5,451,008 | A | 9/1995 | Hamaue | 242/374 |
| 5,553,803 | A | 9/1996 | Mitzkus et al. | 242/374 |
| 5,667,161 | A | 9/1997 | Mitzkus et al. | 242/374 |
| 5,743,480 | A | 4/1998 | Kopetzky et al. | 242/374 |
| 5,833,369 | A | 11/1998 | Heshmat | 384/105 |
| 5,902,049 | A | 5/1999 | Heshmat | 384/106 |
| 6,009,809 | A | 1/2000 | Whang | 102/202.7 |
| 6,419,177 | B2 | 7/2002 | Stevens | 242/374 |
| 6,419,271 | B1 | 7/2002 | Yamada et al. | 280/806 |
| 6,460,794 | B1 | 10/2002 | Stevens | 242/374 |
| 6,460,935 | B1 | 10/2002 | Rees et al. | 297/478 |
| 6,505,790 | B2 | 1/2003 | Stevens | 242/374 |
| 6,505,837 | B1 | 1/2003 | Heshmat | 277/411 |
| 6,520,443 | B2 | 2/2003 | Stevens | 242/374 |
| 6,568,184 | B2 | 5/2003 | Blackburn et al. | 60/636 |
| 6,596,893 | B2 * | 7/2003 | Nakacho et al. | 558/157 |
| 6,634,302 | B1 * | 10/2003 | Rink et al. | 102/530 |
| 6,682,616 | B1 | 1/2004 | Yamato et al. | 149/45 |
| 6,685,220 | B2 | 2/2004 | Ohhashi | 280/733 |
| 6,846,373 | B2 * | 1/2005 | Takayama et al. | 149/46 |
| 2005/0127324 | A1 * | 6/2005 | Wu | 252/181.3 |

* cited by examiner

*Primary Examiner*—Paul N. Dickson
*Assistant Examiner*—Drew J. Brown
(74) *Attorney, Agent, or Firm*—L. C. Begin & Associates, PLLC

(57) ABSTRACT

A gas generating system (24) is provided including a gas generant container (34) and an initiator (28). The initiator (28) is positioned exterior of the gas generant container (34) so as to enable fluid communication with the container (34) upon activation of the initiator (28). A gas generant composition (32) is placed within the container (34). In one embodiment, the gas generant container (34) has sufficient rigidity to maintain a predetermined shape prior to positioning of the gas generant (32) therein, and is penetrable by combustion products resulting from activation of the initiator (28). A flame retardant (33) is positioned within the housing 17 exterior of the gas generant container (34) but in reactive proximity thereto. A seatbelt device (150) and a vehicle occupant restraint system (180) incorporating a gas generating system as described herein are also disclosed.

12 Claims, 5 Drawing Sheets

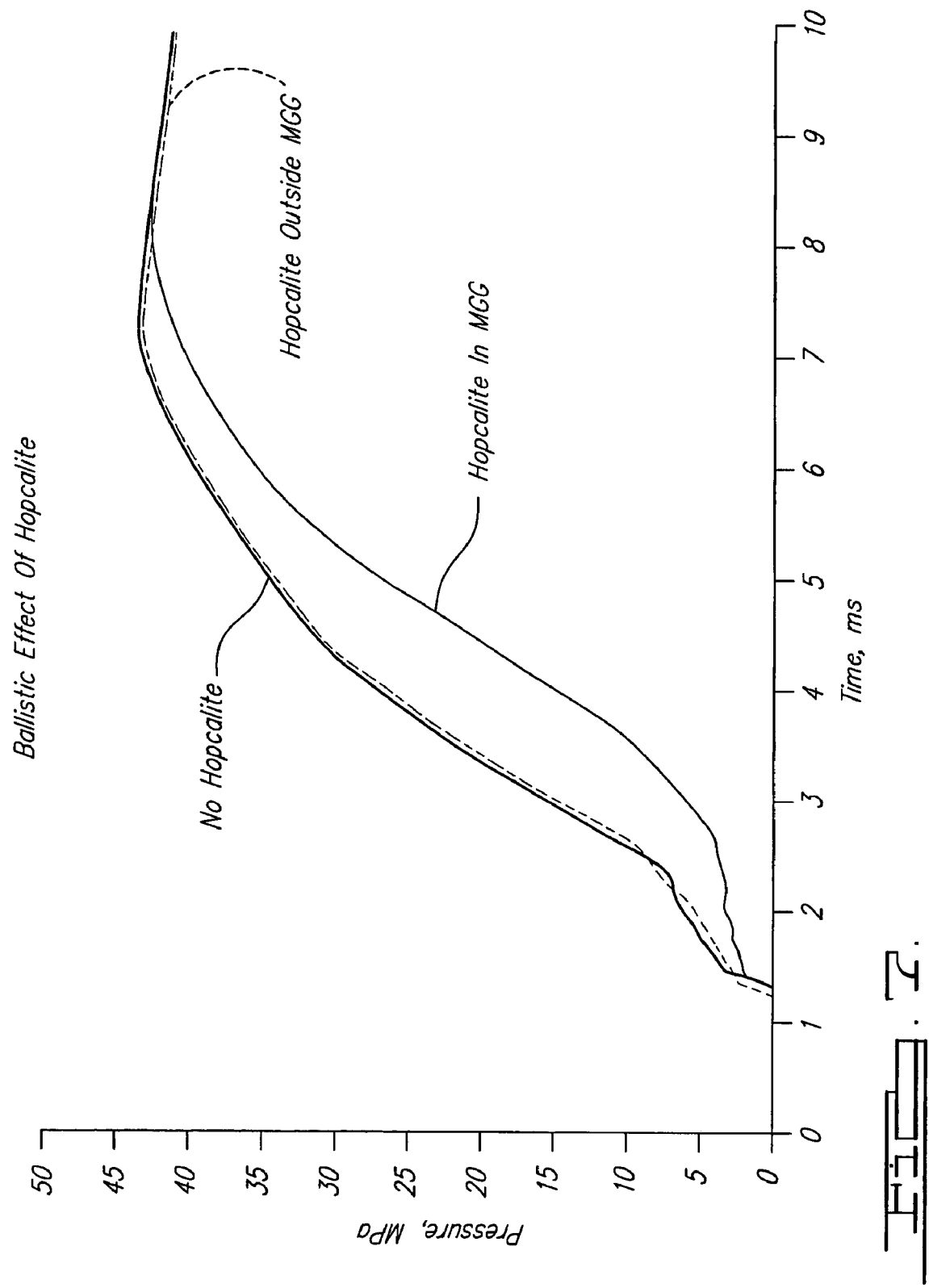

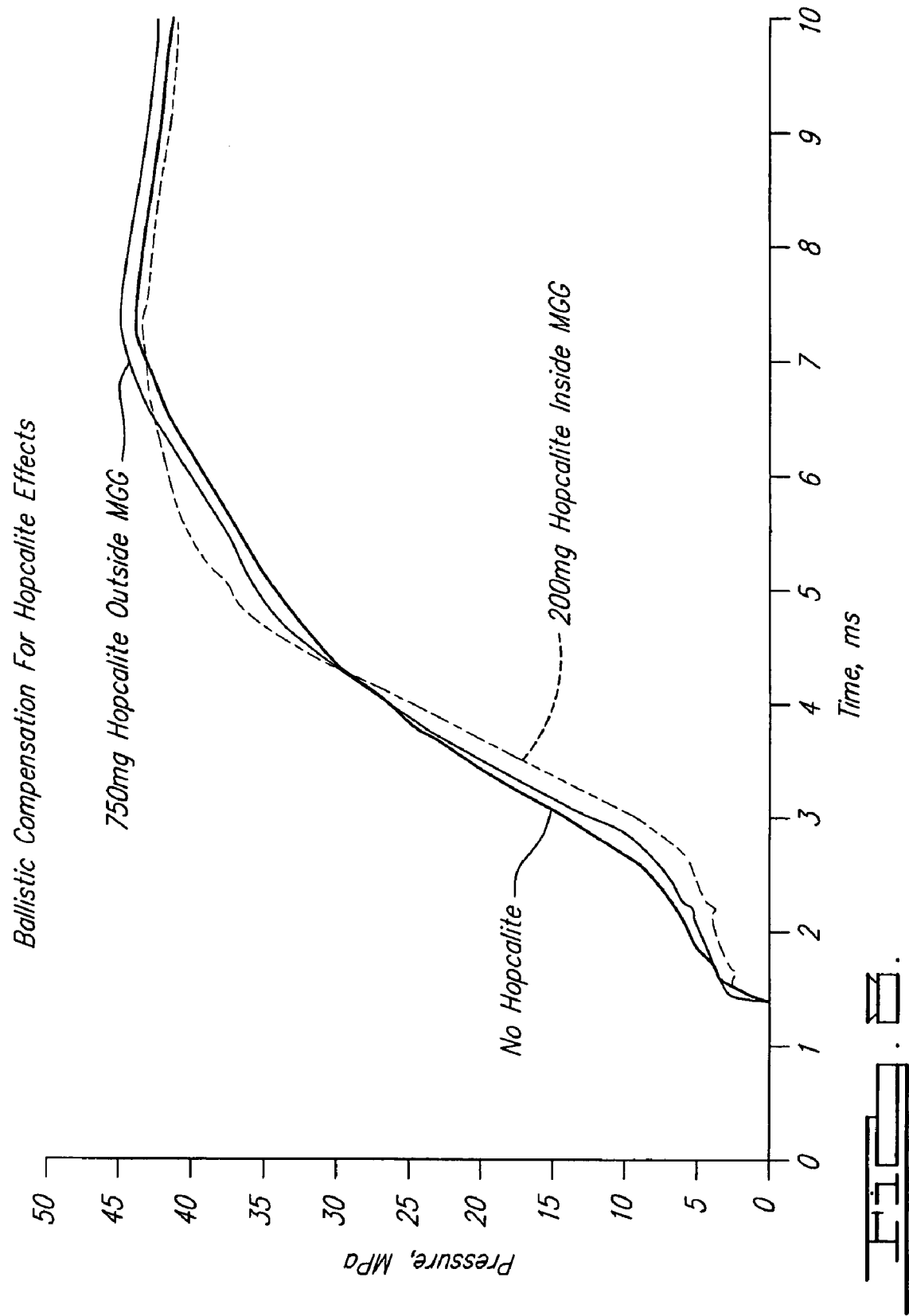

PRETENSIONER

CROSS REFERENCE TO RELATED APPLICATIONS

This application claims the benefit of provisional application Ser. No. 60/628,574, filed on Nov. 17, 2004.

BACKGROUND OF THE INVENTION

The present invention relates generally to gas generating systems and, more particularly, to gas generators used in vehicle occupant protection systems and related components, such as seatbelt pretensioners.

Gas generators used in seatbelt pretensioners are known as micro gas generators due to the relatively small size of the gas generator. Exemplary pretensioners using such micro gas generators include those described in U.S. Pat. Nos. 6,460,794, 6,505,790, 6,520,443, and 6,419,177, incorporated herein by reference. Micro gas generators generally contain an initiator including an initiator charge, a header or initiator holder in which the initiator is received and secured therein, and a gas generant composition which ignites and burns in response to ignition of the initiator to produce gases for actuating the seatbelt pretensioner.

The gas generant composition must be positioned so as to enable ignition thereof by the initiator upon activation of the micro gas generator. In typical micro gas generator designs, a casing containing the gas generant composition is hermetically attached to the initiator holder, with the gas generant composition in direct fluid communication with a casing containing the initiator charge. Upon activation of the initiator, by-products from initiator charge combustion fracture or otherwise penetrate the initiator charge casing, igniting the gas generant. However, the need to provide features enabling hermetic attachment of the gas generant casing to the initiator holder complicates the design of the holder. For example, crimp tabs or flanges formed in the holder for accommodating fasteners for casing attachment, as well as grooves and surfaces formed along the holder to accommodate compliant seals for hermetically encapsulating the gas generant, increase the complexity and cost of fabricating the initiator holder. Furthermore, the provision of sealing elements (for example, O-rings or other gaskets) increases the assembly part count, and the cost and time associated with manufacturing the assembly.

Yet another concern includes the quality of the effluent from gas generators associated with pretensioners. Oftentimes, typical gas generant compositions such as nitrocellulose produce relatively larger amounts of carbon monoxide, as compared to more expensive gas generant compositions for example. A related concern includes post-deployment flaming of the pretensioner and external to the pretensioner. It would therefore be an improvement in the art to retain a relatively cheaper gas generant composition while attenuating the production of carbon monoxide, and while mitigating the likelihood of post-deployment flaming external to the pretensioner.

SUMMARY OF THE INVENTION

A gas generating system is provided including a gas generant container and an initiator. The initiator is positioned exterior of the gas generant container so as to enable fluid communication with the container upon activation of the initiator. A gas generant composition is hermetically sealed in an interior of the container. The gas generant container has sufficient rigidity to maintain a predetermined shape prior to positioning of the gas generant therein, and is penetrable by combustion products resulting from activation of the initiator.

A gas generating system of the present invention also includes a flame retardant containing at least one metallic oxide separate or spaced apart from the gas generator but within the same assembly such as a seatbelt pretensioner. By including an oxide external of the gas generator but within the system housing, carbon monoxide may be converted to carbon dioxide without adversely affecting the ballistic performance of the assembly, a pretensioner for example. It has also been found that the use of at least one metallic oxide within the system housing but external to the gas generator results in little if any post-deployment flaming.

BRIEF DESCRIPTION OF THE DRAWINGS

FIG. 7 is a graph illustrating pressure over time with the use of an oxide in accordance with the present invention.

FIG. 8 is a graph illustrating pressure over time with the use of an oxide in accordance with the present invention.

DETAILED DESCRIPTION

Figure 1:
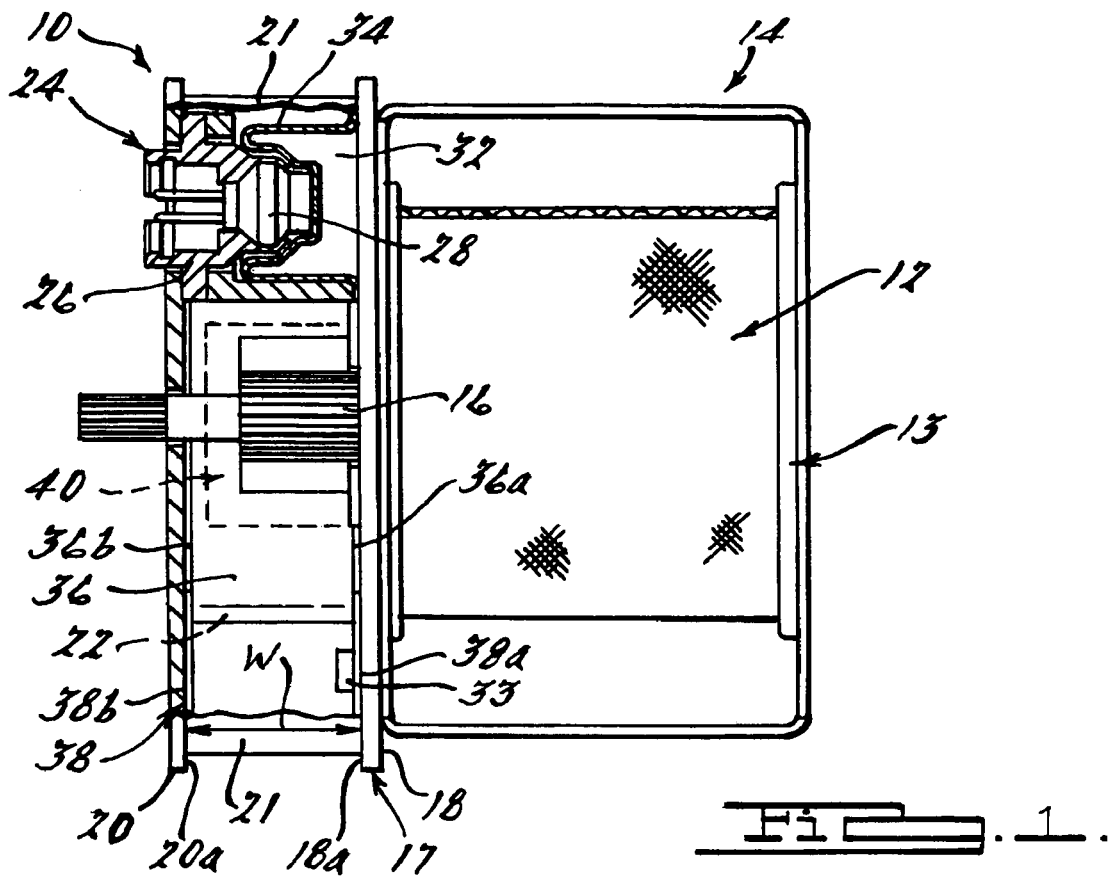
FIG. 1 is a cross-sectional side view of a pretensioner incorporating a gas generator in accordance with the present invention.
Figure 2:
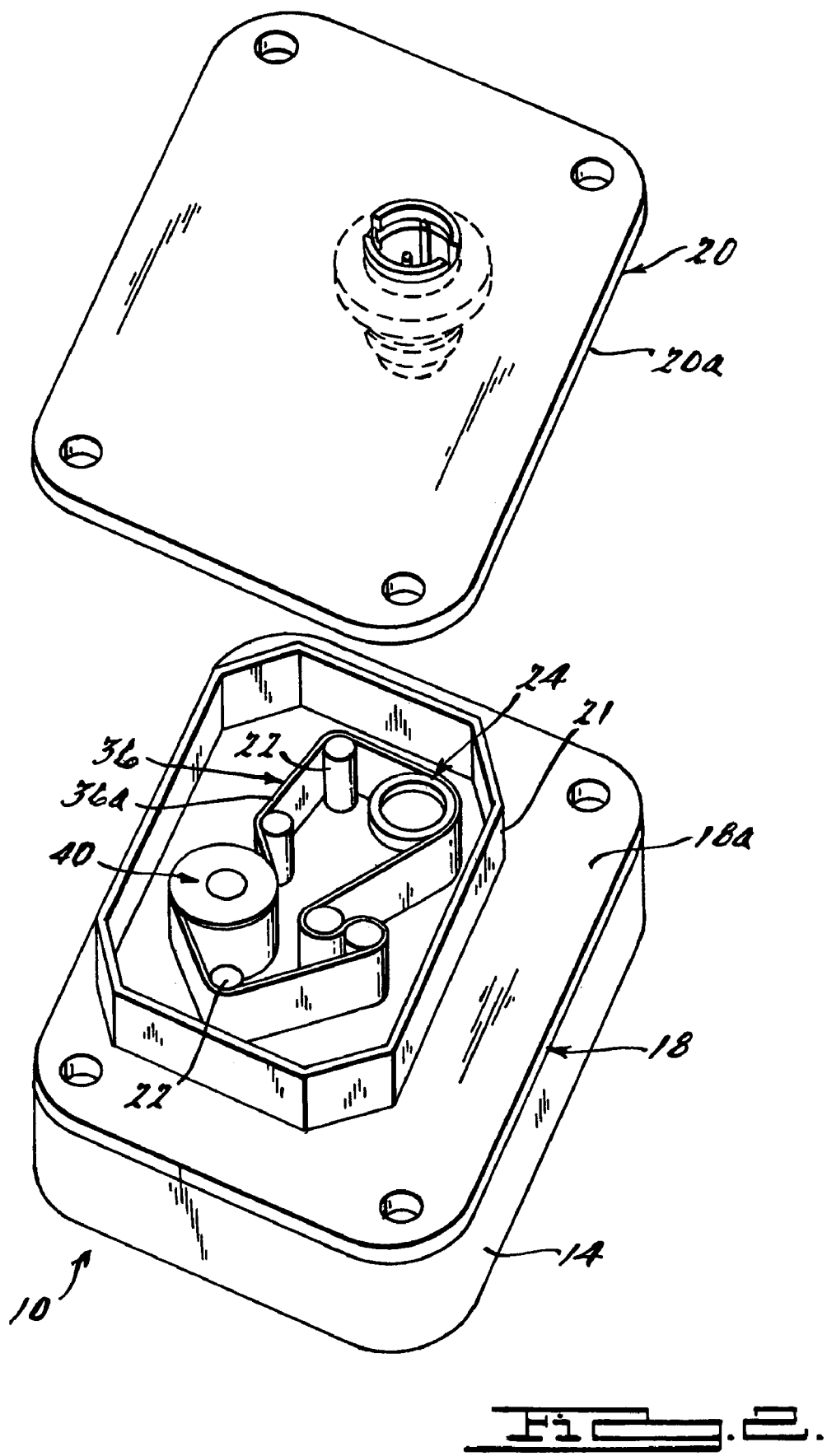
FIG. 2 is a perspective view of the pretensioner shown in FIG. 1.

Referring to FIGS. 1 and 2, a pyrotechnic pretensioner 10 in accordance with one embodiment of the invention is employed to pretension a seat belt 12 wound about a reel 13 of a conventional seat belt retractor 14. "Pretensioning" is generally defined as taking up slack in the seat belt in the event of sudden deceleration or collision. A webbing reel retractor shaft 16 extends from retractor 14 into pretensioner 10 and thereby cooperates with the pretensioner 10 to tighten the seatbelt 12 in the event of an accident. The pretensioner of the present invention has generic application, for example only, in seatbelt assemblies having seatbelt retractors as described in U.S. Pat. Nos. 4,558,832 and 4,597,546, incorporated herein by reference.

Referring to FIGS. 1 and 2, pretensioner 10 includes a housing 17 having a first plate 18 and a second plate 20 spaced apart from the first plate. The region between plates 18 and 20 defines an interior of the housing. In one embodiment, a plurality of spacers 22 is secured between first plate 18 and second plate 20 to secure the plates in position relative to one another, thereby providing and maintaining the spacing between the plates. Separation between plates 18 and 20 is also (or alternatively) provided by an outer wall 21 extending between the plates and substantially along the outer edges of the plates to enclose the components of the pretensioner described below. Plates 18 and 20 have opposed respective interior faces 18a and 20a. Faces 18a and 20a are substantially flat.

Spacers 22 each have a pair of opposite end portions with each end portion being secured to a respective one of first plate 18 or second plate 20 using one of a variety of known methods, such as welding, fasteners, adhesives, etc. Spacers 22 are positioned within housing 17 to serve as guides around which a strap 36 (described below) is wound. Also, in one embodiment, spacers 22 have substantially equal lengths to provide a substantially equal separation distance between plates 18 and 20 along the extent of interior faces 18a and 20a. Plates 18, 20 and spacers 22 are formed from steel, aluminum, metal alloys, plastic, and/or other known materials suitable for the applications described herein.

Figure 3:
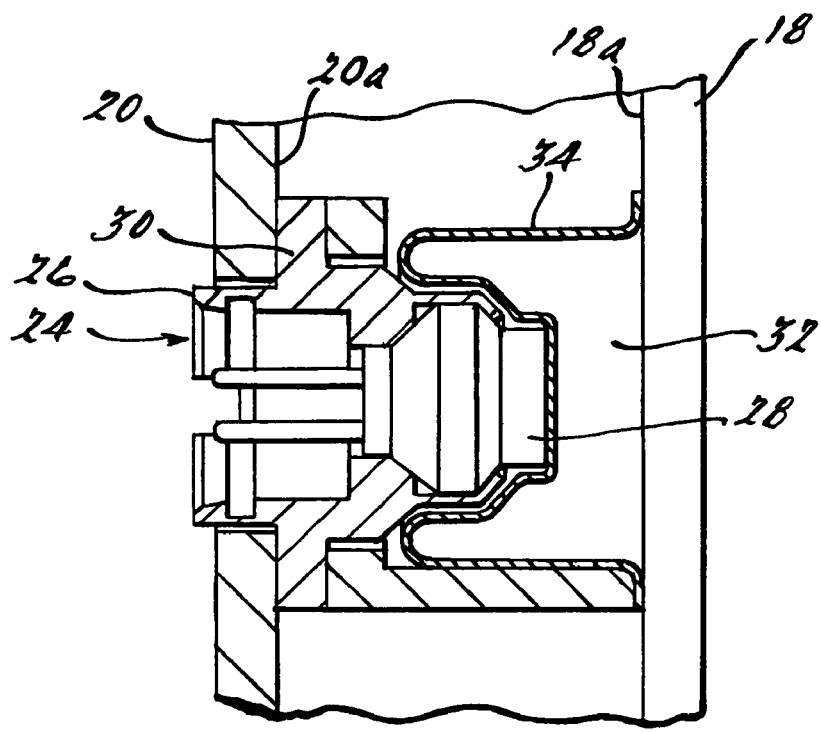
FIG. 3 is a cross-sectional side view of a gas generator in accordance with the present invention.

Referring to FIG. 3, a gas generating system 24 is positioned in the interior of the housing for generating inflation gas used to activate pretensioner 10. Gas generating system 24 includes an initiator assembly 26 comprising a header or initiator holder 30, and an initiator 28 secured in header 30.

On example of an initiator suitable for use in the present invention is described in U.S. Pat. No. 6,009,809, incorporated herein by reference. Initiator 28 may be secured in header 30 using any one of several known methods, such as crimping, welding, press-fitting, molding, or the application of adhesives or fasteners. Alternatively, initiator 28 may be secured within a portion of the pretensioner assembly without the use of a holder, using one or more of the methods set forth above.

Header 30 is also secured to one of first plate 18 or second plate 20 using any one of several known methods, such as crimping, welding, press-fitting, or the application of adhesives or fasteners. Header 30 may be formed form a metal, a metal alloy, or a polymeric material.

A gas generant composition 32 is positioned within housing 17, between first plate 18 and second plate 20 in a location that enables fluid communication with initiator 28 upon activation of the initiator. Gas generant compositions suitable for use in the gas generator of the present invention include nitrocellulose, compounds containing a mixture of nitroguanadine, potassium perchlorate and cellulose acetate butyrate, compounds containing a mixture of epoxy and potassium perchlorate, and compounds containing a mixture of epoxy, silicone, and potassium perchlorate. These compositions exemplify, but do not limit, useful gas generant compositions.

In the embodiment shown in FIG. 3, a container 34 is provided for enclosing and positioning gas generant composition 32 in relation to initiator 28. In one embodiment, the container 34 is in the form of a cup formed from aluminum, a metal alloy, a polymer material, or any other material that is formable into the shape required for the cup and frangible, meltable, or otherwise penetrable when exposed to the pressure and/or heat and/or other by-products of combustion of the initiator charge. Cup 34 is hermetically sealed and positioned and secured relative to initiator 28 so as to enable fluid communication between the cup and initiator charge combustion products upon activation of the initiator. In the embodiment shown in FIG. 1-5, cup 34 welded or otherwise attached to one plates 18, 20 adjacent to or abutting initiator 28 so as to be fracturable by initiator 28, to expose gas generant 32 to ignition products, thereby igniting the gas generant. Alternatively, cup 34 may be positioned spaced apart from the initiator and secured to any suitable component of the pretensioner assembly.

Cup 34 may be hermetically sealed by positioning the gas generant composition therein and affixing portions of the cup to the housing or other portion of the pretensioner assembly. Alternatively, the gas generant may be positioned within the cup and the cup hermetically sealed to form a separate sub-assembly prior to attachment to the pretensioner assembly. Storing the gas generant in a hermetically sealed cup detached from, but positioned proximate, the initiator assembly obviates the need to attach and hermetically seal the gas generant to the initiator assembly itself, thereby simplifying the design of the initiator assembly.

In an alternative embodiment, the gas generant composition is hermetically sealed within a separate packet (for example, a polymer bag) which is positioned within frangible cup 34. Cup 34 is then attached to the pretensioner assembly so as to enable fluid communication between the cup and initiator charge combustion products upon activation of the initiator. This enables a predetermined quantity of gas generant to be easily positioned and secured in a fixed location with respect to the initiator, while obviating the need to hermetically seal cup 34 during assembly.

Referring again to FIGS. 1 and 2, a strap 36 has opposite end portions wrapped around and secured to a portion of a clutch assembly 40 (described below), a body 36a extending between the end portions, and a pair of opposed lateral edges 36b, and 36c. Strap body 36a has a width W between lateral edges 36b and 36c dimensioned to provide a slight clearance fit with first plate 18 and second plate 20, along strap lateral edges 36b and 36c. Body 36a extends from clutch assembly 40 to wrap around spacers 22 and micro gas generator 24, thereby defining an enclosure, generally designated 37 (FIG. 4), bounded by first and second plates 18, 20 and by strap body 36a. Strap 36 is preferably made from steel or some other hard and ductile metal or alloy. Strap 36 may be cut from steel sheet metal, for example. In a manner described below, strap 36 acts as a medium for transferring forces produced by expansion of inflation gases to a clutch assembly (described below), thereby actuating the pretensioner.

Referring again to FIG. 1, a seal 38 is provided for maintaining inflation gases within chamber 37 during extension of strap 36 and the resulting expansion of the chamber. In one embodiment, seal 38 is a compliant foil seal, one example of which is manufactured by Mohawk Innovative Technology, Inc., of Albany, N.Y. The compliant foil seal includes a smooth, compliant foil 38a supported by an elastic strip 38b designed to provide spatially variable stiffness and damping support for foil 38a. The foil and support strip are affixed to interior face 18a of first plate 18, and to interior face 20a of second plate 20. Principles of construction of foil seals usable in the pretensioner of the present invention are described in U.S. Pat. Nos. 6,505,837, 5,833,369, and 5,902,049, all incorporated herein by reference. Other embodiments of the foil seal and alternative types of seals suitable for substantially maintaining inflation gases within chamber 37 are also contemplated for use in the pretensioner described herein.

A clutch assembly, generally designated 40, is provided for coupling strap 36 to retractor shaft 16 upon activation of the pretensioner and extension of strap 36. As used herein, the term "clutch assembly" is meant to apply generically to any clutch component or combination of components that are useful in the seatbelt retractor and pretensioner art. Stated another way, a "clutch assembly" is any component or combination of components that exert a rotary force on the retractor shaft 16 and thus produce a pretensioning or tightening of belt 12 by winding the associated webbing reel 13. In general, a portion of clutch assembly 40 has ends of strap 36 secured thereto and is spring-loaded so that slack is substantially removed from the strap prior to activation of the pretensioner. Many such assemblies are known in the art. For example, U.S. Pat. Nos. 5,743,480, 6,419,177 and 5,222,994, incorporated herein by reference, describe a few of the known clutch assemblies suitable for use with the pretensioner of the present invention.

Components of clutch assembly 40 may be die cast from aluminum, steel or suitable alloys thereof. Alternatively, the components may be injection molded if plastic material is used. In a preferred embodiment, the clutch assembly components are formed from hard resilient plastic thereby reducing the weight of pretensioner 10.

In further accordance with the present invention, a flame retardant/carbon monoxide reducer 33 is provided within the housing 17. As shown in the Figures, the flame retardant 33 is positioned within the housing 17, external of the gas generator 24, and reacts with the combustion effluent exiting the gas generating system 24. As a result, it is believed that carbon monoxide is converted to carbon dioxide and that flame formation is inhibited upon deployment of the gas generator. The flame retardant 33 may be positioned wherever operable within the housing 17, and accordingly, although effective, the flame retardant 33 does not limit the design permutations that may be considered for placement of the initiator 28, for example.

The flame retardant 33 is generally selected from at least one or more compounds selected from manganese dioxide, iron oxide, copper oxide, aluminum oxide, lithium oxide, and mixtures thereof. Each of the oxides may be present in singular oxidation states or in mixed oxidation states with regard to the respective metal. The flame retardant 33 is typically provided in a quantity or molar amount sufficient to oxidize a predetermined amount of carbon monoxide in the combustion gases. As such, the total amount of flame retardant 33 employed may, for example, be determined by analytically evaluating the average amount of carbon monoxide in the combustion gas of a given pretensioner and then employing an oxide (that is a compound having oxide character such as a dioxide or oxide) or mixture of oxides that in molar equivalents represent an amount sufficient to oxidize a desirable amount of carbon monoxide in the combustion gas. This may be determined on an iterative basis depending on the amount and type of gas generant employed (nitrocellulose for example), and on the type of gas generant system 24 or assembly that the system 24 is employed within. The flame retardant 33 may be provided within the housing 17 by providing at least one of the oxides described, and then positioning the flame retardant 33 operably proximate to the initiator 28 and the gas generator container 34. It will be appreciated that varying the position of the flame retardant 33 may optimize the carbon monoxide reduction and flame inhibition. In another embodiment, at least one or more oxides may be mixed and formed into a flame retardant 33 tailored to reduce the carbon monoxide typically produced in a respective assembly. The flame retardant 33 may be provided for example, by Molecular Products Limited, Mill End, Thaxted, Exxex, United Kingdom, as Hopcalite™. Hopcalite typically contains a mixture of two or more of the following materials: manganese dioxide, copper oxide, aluminum oxide, and lithium oxide.

As shown in FIG. 7, the use of Hopcalite may adversely affect the pressure over time as the gas generant is combusted, if the Hopcalite is included within the gas generator container 34. However, when Hopcalite is employed outside of the gas generator container 34, the pressure is sustained at desirable levels rather than at lower levels. A relative increase in the amount of Hopcalite employed exterior to the gas generant container 34 will contribute to lesser amounts of carbon monoxide and greater flame inhibition, without adverse ballistic effects. As shown in FIG. 8, Hopcalite is provided at 200 mg within the gas generator 34 and compared to Hopcalite provided at 750 mg exterior of the gas generator 34. The gas generant load relative to each curve is essentially equivalent to the other curve in FIGS. 7 and 8, or, each curve in the figures was generated by operation of an equivalent inflator having an essentially equivalent gas generant load. It will be appreciated that although the present context is described as within a strap pretensioner, other applications include cable-operating buckle pretensioners, ball pretensioners, and rack and pinion pretensioners, for example. Therefore, wherever carbon monoxide and flame are desirably controlled within a vehicle occupant protection system, the same strategy of employing the flame retardant 33 may be employed.

Figure 4:
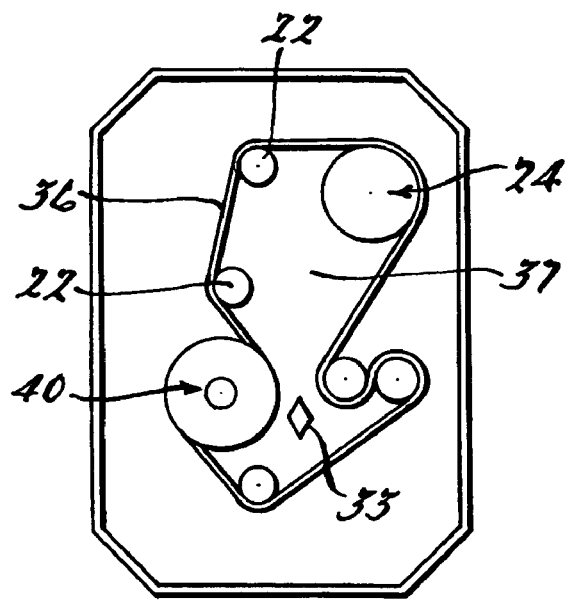
FIG. 4 is a cross-sectional plan view of the pretensioner of FIG. 1 showing the arrangement of the strap prior to pretensioner activation.
Figure 5:
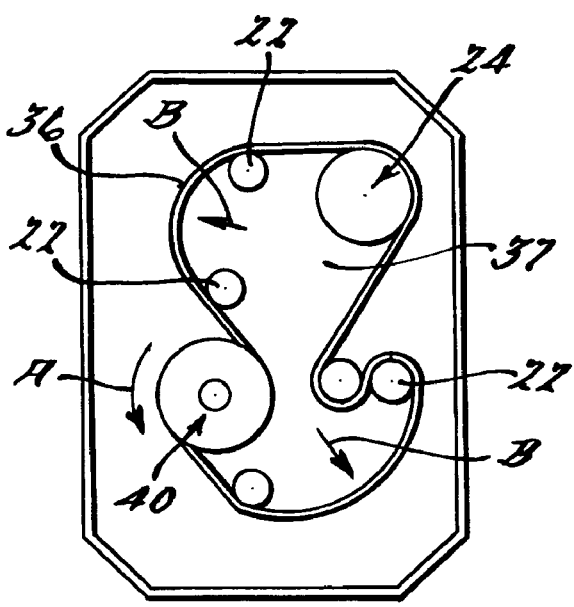
FIG. 5 is the view of FIG. 4 showing the extension of the strap after pretensioner activation.
Figure 6:
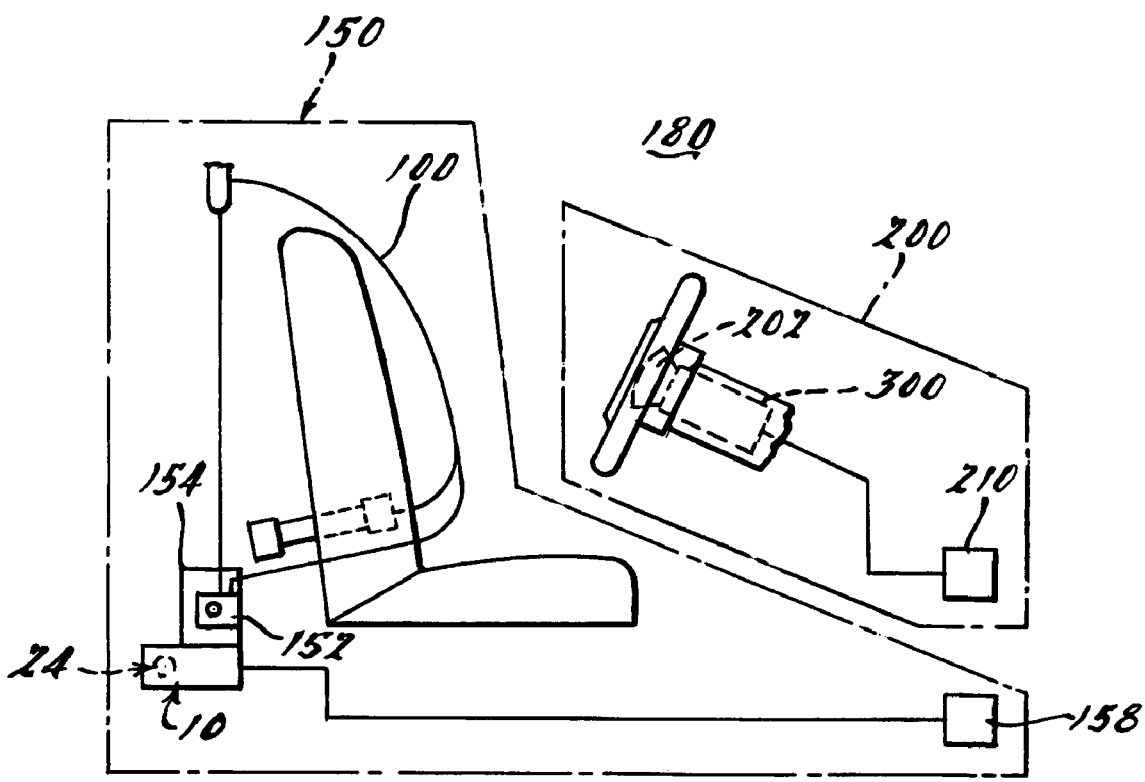
FIG. 6 is a schematic representation of an exemplary vehicle occupant restraint system including a micro gas generator incorporating a blast director in accordance with the present invention.

Prior to activation and as shown in FIGS. 4 and 5, pretensioner 10 is operatively disengaged from retractor shaft 16 so as not to interfere with normal operation (i.e., seatbelt unwinding and rewinding) of the retractor. In operation, electrical contacts on initiator 28 communicate with a sensor that signals actuation of pretensioner 10. Upon operation of the gas generating system 24, when initiator 28 receives a signal, from an accelerometer for example, the initiator charge contained in initiator 28 ignites, fracturing or otherwise penetrating the wall of cup 34 containing gas generant composition 32, igniting the gas generant. The gas pressure from combustion of gas generant 32 produces tension forces acting along strap 36, causing a corresponding extension of the strap and resulting in expansion of chamber 37 in the directions indicated by arrows B. As chamber 37 expands, tension on strap 36 forces end portions of strap 36 attached to clutch assembly 40 to pull on the clutch assembly, resulting in a sudden rotation of the portion of the assembly attached to strap 36, in the direction indicated by arrow A. This sudden rotation activates the clutch assembly, causing it to engage retractor shaft 16 and forcing the retractor shaft to rotate in the direction indicated by arrow A, thereby pretensioning the safety belt. In one embodiment of the compliant foil seal previously described, a thin, high pressure gas film is formed between each of strap lateral edges 36b, 36c and a foil surface 38a positioned along a corresponding adjacent interior face of one of plates 18 and 20 during expansion of the inflation gas and the resulting extension of strap 36. This thin gas film separates the foil surface from the lateral edge of strap 36, enabling non-contact movement of strap 36 along plate interior surfaces 18a and 20a and inhibiting leakage of inflation gases between the foil 38a and strap 36. Relative positions of spacers along interior faces 18a and 20a may be determined as required to channel or guide expansion of the strap into desired portions of the housing interior (for example, in cases where the size envelope occupied by housing 17 is restricted to a certain size or configuration).

Referring to FIG. 5, in a particular application, a micro gas generator 24 as described herein is incorporated into a safety belt pretensioner 10 employed in a safety belt assembly 150 used in a vehicle occupant restraint system 180. Safety belt assembly 150 includes a safety belt housing 152 and a safety belt 100 extending from housing 152. A safety belt retractor mechanism 154 (for example, a spring-loaded mechanism) may be coupled to an end portion of the belt. Safety belt pretensioner 10 may be coupled to belt retractor mechanism 154 to actuate the retractor mechanism in the event of a collision. Micro gas generator 24 is adapted to actuate seat belt retractor mechanism 154 to pretension safety belt 160. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Safety belt assembly 150 may be in communication with a known crash event sensor 158 (for example, an inertia sensor or an accelerometer) that is in operative communication with a known crash sensor algorithm (not shown) which signals actuation of belt pretensioner 10 via, for example, activation of initiator 28 (not shown in FIG. 5) in micro gas generator 24. U.S. Pat. Nos. 6,505,790 and 6,419,177 provide illustrative examples of pretensioners actuated in such a manner.

Referring again to FIG. 5, vehicle occupant restraint system 180 may also include additional elements such as an airbag system 200. Stated another way, vehicle occupant protection system 180 may contain one or more gas generating devices containing a fire retardant 33, and/or containing an initiator 28 positioned in operable proximity to a gas generant container. In the embodiment shown in FIG. 5, airbag system 200 includes at least one airbag 202 and an inflator 300 coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 300 in the event of a collision.

It should be appreciated that safety belt assembly 150, airbag system 200, and more broadly, vehicle occupant protection system 180 exemplify but do not limit gas generating systems contemplated in accordance with the present invention.

Embodiments of the micro gas generator described herein may also have application in other elements typically employed in vehicle occupant protection systems. A vehicle occupant protection system may be defined to include at least one of the following: a device such as an airbelt, a buckle pretensioner, and/or a pyrotechnic actuator. Embodiments of the micro gas generator described herein may also be used, for example, with an airbelt (as exemplified in U.S. Pat. No. 6,685,220, incorporated herein by reference); with a buckle pretensioner (as exemplified in published U.S. Pat. No. 6,460,935, incorporated herein by reference); with a piston-based pyrotechnic actuator (as exemplified in U.S. Pat. No. 6,568,184, incorporated herein by reference), or with any other device incorporating a micro gas generator of the present invention within a vehicle occupant protection system. Additionally, the vehicle occupant protection system may also include, in addition to the device(s) containing the micro gas generator, other device(s) typically employed in vehicle occupant protection systems, such as an airbag system 200 as described above.

Unless otherwise noted, elements of the gas generator and pretensioner described herein may be fabricated using methods known in the art. In addition, a gas generator as described herein may be incorporated into any of a wide variety of alternative pretensioner designs. In addition, the embodiments of the gas generator described herein are not limited to use in seatbelt pretensioners, but may also be used in other applications. It will also be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
 a gas generator for production of gas; and
 a flame retardant positioned exterior to the gas generator, said flame retardant comprising at least one metal oxide,
 wherein upon activation of the gas generator, the gas is at least partially reactable with the flame retardant, and, said flame retardant is provided in a molar amount sufficient to oxidize a predetermined amount of carbon monoxide formed upon activation of said gas generator.

2. The gas generating system of claim 1 wherein said gas generating system is a seatbelt pretensioner, and said gas generator and flame retardant are contained within the seatbelt pretensioner.

3. The gas generating system of claim 1 wherein said metal oxide is selected from the group consisting of manganese dioxide, iron oxide, copper oxide, aluminum oxide, lithium oxide, and mixtures thereof.

4. The gas generating system of claim 1 wherein said metal oxide is formed by mixing two or more metal oxides selected from the group consisting of manganese dioxide, copper oxide, aluminum oxide, and lithium oxide.

5. The gas generating system of claim 1 wherein said gas generator contains a gas generant that produces carbon monoxide upon combustion thereof.

6. The gas generating system of claim 1 wherein said gas generator contains nitrocellulose as a gas generant.

7. A seatbelt device comprising:
 a housing:
 a gas generator contained within said housing;
 a gas generating composition contained within said gas generator, said gas generating composition combusted to produce gas including carbon monoxide;
 a flame retardant positioned within said housing and exterior to the gas generator, said flame retardant comprising at least one metal oxide,
 wherein upon activation of the gas generator, the gas is at least partially reactable with the flame retardant, and, said flame retardant is provided in a molar amount sufficient to oxidize a predetermined amount of carbon monoxide formed upon activation of said gas generator.

8. The seatbelt device of claim 7 wherein said metal oxide is selected from the group consisting of manganese dioxide, iron oxide, copper oxide, aluminum oxide, lithium oxide, and mixtures thereof.

9. The seatbelt device of claim 7 wherein said metal oxide is formed by mixing two or more metal oxides selected from the group consisting of manganese dioxide, copper oxide, aluminum oxide, and lithium oxide.

10. The gas generating system of claim 7 wherein said gas generator contains a gas generant that produces carbon monoxide upon combustion thereof.

11. The gas generating system of claim 7 wherein said gas generating composition comprises nitrocellulose.

12. A vehicle occupant protection system comprising:
 a gas generator contained within said vehicle occupant protection system;
 a gas generating composition contained within said gas generator, said gas generating composition combusted to produce gas including carbon monoxide; and
 a flame retardant positioned within said housing and exterior to the gas generator, said flame retardant comprising at least one metal oxide,
 wherein upon activation of the gas generator, the gas is at least partially reactable with the flame retardant, and, said flame retardant is provided in a molar amount sufficient to oxidize a predetermined amount of carbon monoxide formed upon activation of said gas generator.

* * * * *